H. HELD.
VAULT LIGHT.
APPLICATION FILED JUNE 7, 1911.

1,007,352.

Patented Oct. 31, 1911.

Attest:

Inventor:
H. Held
by
his Atty

UNITED STATES PATENT OFFICE.

HENRY HELD, OF RICHMOND HILL, NEW YORK.

VAULT-LIGHT.

1,007,352.  Specification of Letters Patent.  Patented Oct. 31, 1911.

Application filed June 7, 1911. Serial No. 631,688.

*To all whom it may concern:*

Be it known that I, HENRY HELD, a citizen of the United States, and a resident of Richmond Hill, borough of Queens, in the county of Queens and State of New York, have invented certain new and useful Improvements in Vault-Lights, of which the following is a specification.

This invention relates to improvements in vault lights and particularly to that class of vault lights in which the lenses are supported in a frame of reinforced concrete.

The object of my invention is to provide a new and improved vault light of this kind which is simple in construction, strong and durable, prevents the scaling of the lenses and presents a continuous glass face at the underside of the vault light, and which vault light is not expensive.

Figure 1:
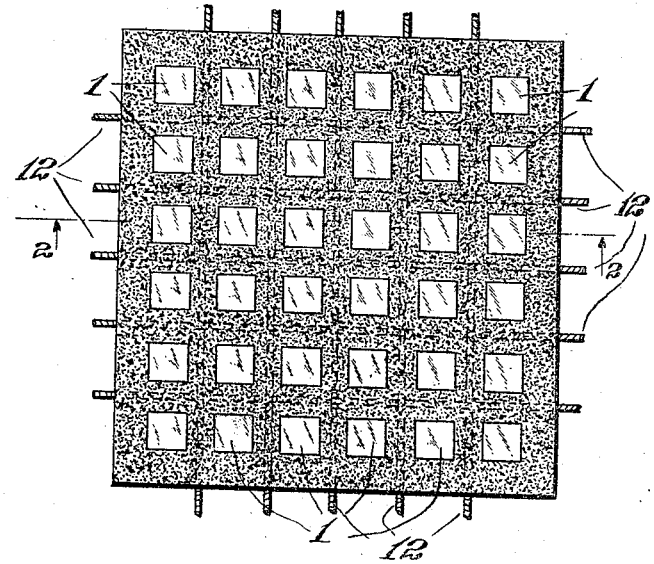
Figure 2:
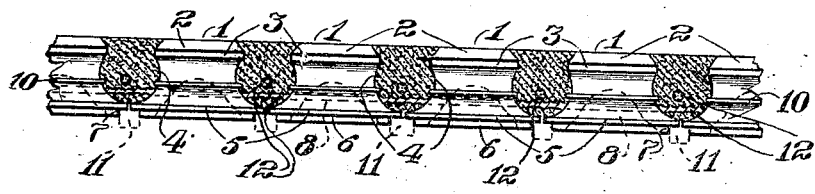
Figure 3:
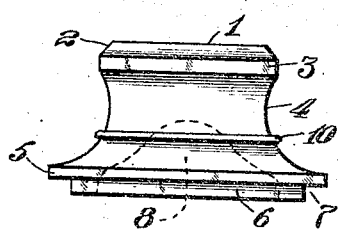
Figure 4:
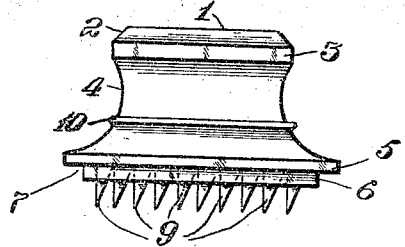

In the accompanying drawings in which like letters of reference indicate like parts in all the figures: Figure 1 is a plan view of a section of my vault light. Fig. 2 is an enlarged cross sectional view of the same on the line $x$—$x$ Fig. 1. Fig. 3 is an enlarged detail side view of one of the lenses. Fig. 4 is a similar view of a lens showing a modified construction.

The lenses or glass lights 1 which I use in making my improved vault light are square in shape at the underside and are preferably square in shape at the top. The upper edge of each lens is beveled downward and outward on each edge as shown at 2 and then extends down vertically to form a collar 3. From the underside of the collar the sides of the lens are curved inward and downward and then outward toward the bottom so that the bottom area of the lens is considerably larger than the top area and at the bottom of this concavely curved line 4 there is a vertical shoulder 5 around the entire lens and which forms a square. A short distance inward from the edges of the shoulder 5 a square projection 6 is formed on the underside of the lens producing a rabbet 7 along the bottom edges of the lens. The underside of the lens may be hollowed out as indicated in dotted lines at 8 in Fig. 3 or it may be provided with a series of prisms as shown at 9 in Fig. 4. A projecting collar or band 10 is formed around the downwardly and outwardly flaring part 4 of the lens at about one half the height of the same for a purpose that will be set forth.

In making the vault light, the lenses 1 are placed upon a series of wooden slats shown in dotted lines at 11 in Fig. 2 in such a manner that the rabbet 7 engages the side edges of these slats and the shoulders 5 of the several lenses are in snug contact both in longitudinal and transverse direction of the vault light. When the vault light is completed and the temporary supporting slats 11 are removed the entire bottom of the vault light will be composed of glass and no supporting bars or frames or cement will be visible from below, as portions of the lenses extend beneath the cement and the bottom edges of the several lenses are all in close contact along all their edges. Between the several lenses longitudinal and transverse grooves are thus formed which are substantially circular, but are flared upward and outward at the top, which flaring is produced by the bevels 2 along the tops of the lenses. A quantity of cement is placed within these grooves and then the longitudinal and transverse reinforcing rods 12 of metal preferably twisted iron rods, are placed centrally in these grooves so as to cross each other and then these grooves are filled with a suitable cement or concrete mixture which is finished off at its top flush with the upper surface of the lenses and this cement or concrete placed into the grooves and surrounding the reinforcing rods 12 forms the frame-work of the vault light. When the cement is set and hardened the temporary supporting slats 11 are removed. The upper flaring parts of the cement supporting ribs extend over the beveled portions 2 at the tops of the lenses which permits the lenses and in fact the entire vault light to expand and contract without chipping or scaling the lenses. Likewise the edge parts of the cement ribs extending over the bevels of the lenses cannot chip off because the cement ribs form one solid homogeneous body of practically the entire depth of the vault light. The central ribs 10 on the lenses extend into the reinforced cement ribs and engage the same assisting in supporting the lenses from the reinforced cement ribs and in preventing any displacement whatever of the lenses in the frame.

Having described my invention what I claim as new and desire to secure by Letters Patent is:—

In a vault light, in combination a series of lenses which have a greater area at their bottoms than at their tops, each lens having its upper edges beveled downward and outward, a straight shoulder formed at the bottom of each bevel, the sides of the lens being curved on a concave line downward and outward from the shoulder to the bottom, the bottom having greater area than the top and the several edges of the several lenses being in contact at the bottom, and reinforced concrete ribs formed between the concave sides of the lenses and overlapping the bevels at the upper ends of the lenses, the upper surface of the concrete ribs being flush with the tops of the lenses, substantially as set forth.

Signed at Brooklyn, N. Y., in the county of Kings and State of New York, this 19th day of May, A. D. 1911.

HENRY HELD.

Witnesses:
JOHN J. SIGRIST,
EVA BLACKBALL.